US012246947B2

(12) United States Patent
Lendi et al.

(10) Patent No.: US 12,246,947 B2
(45) Date of Patent: Mar. 11, 2025

(54) METHOD FOR SAFEGUARDING THE CAR OF AN ELEVATOR

(71) Applicant: Cedes AG, Landquart (CH)

(72) Inventors: Marcial Lendi, Näfels (CH); Martin Hardegger, Sargans (CH)

(73) Assignee: CEDES AG, Landquart (CH)

( * ) Notice: Subject to any disclaimer, the term of this patent is extended or adjusted under 35 U.S.C. 154(b) by 1322 days.

(21) Appl. No.: 16/887,495

(22) Filed: May 29, 2020

(65) Prior Publication Data

US 2020/0377334 A1 Dec. 3, 2020

(30) Foreign Application Priority Data

May 31, 2019 (EP) .................................... 19177694

(51) Int. Cl.

| | |
|---|---|
| ***B66B 5/00*** | (2006.01) |
| ***B66B 1/32*** | (2006.01) |
| ***B66B 1/34*** | (2006.01) |
| ***B66B 3/00*** | (2006.01) |
| ***B66B 5/02*** | (2006.01) |

(52) U.S. Cl.

CPC .............. *B66B 5/0031* (2013.01); *B66B 1/32* (2013.01); *B66B 1/3492* (2013.01); *B66B 3/002* (2013.01); *B66B 5/02* (2013.01)

(58) Field of Classification Search

CPC ....... B66B 5/0031; B66B 1/32; B66B 1/3492; B66B 3/002; B66B 5/02; B66B 5/027; B66B 13/22; B66B 5/0018; B66B 11/0293

See application file for complete search history.

(56) References Cited

U.S. PATENT DOCUMENTS

| | | | | |
|---|---|---|---|---|
| 7,370,731 | B2 * | 5/2008 | Cocher | B66B 13/12 187/314 |
| 2017/0233221 | A1 | 8/2017 | Geisshüsler et al. | |
| 2018/0037436 | A1 * | 2/2018 | Aitamurto | B66B 5/04 |
| 2018/0201479 | A1 | 7/2018 | Taudou et al. | |

FOREIGN PATENT DOCUMENTS

| | | |
|---|---|---|
| DE | 10 2009 037 634 A1 | 2/2011 |
| JP | S56-033369 A1 | 4/1981 |

OTHER PUBLICATIONS

Extended European Search Report (Application No. 19177694.7) dated Jan. 27, 2020.

* cited by examiner

*Primary Examiner* — Jeffrey Donels

(74) *Attorney, Agent, or Firm* — BURR PATENT LAW, PLLC

(57) ABSTRACT

The method according to the invention is a method for safeguarding the car of an elevator, which is provided to form regular unlocking zones in the region around the envisaged stopping points at the stories, against unintended movement. The method monitors the speed of the car, the height position of the car in the elevator shaft and the status of the locking of the car door, and identifies possible stopping of the car, the height position of the car outside a regular unlocking zone, and a possibly unlocked state of the car door. A first sub-method of the method forms a temporary unlocking zone when the car stops outside a regular unlocking zone with the car door unlocked, and it assigns the temporary unlocking zone an upper and a lower boundary above and below the position where the car stops.

10 Claims, 1 Drawing Sheet

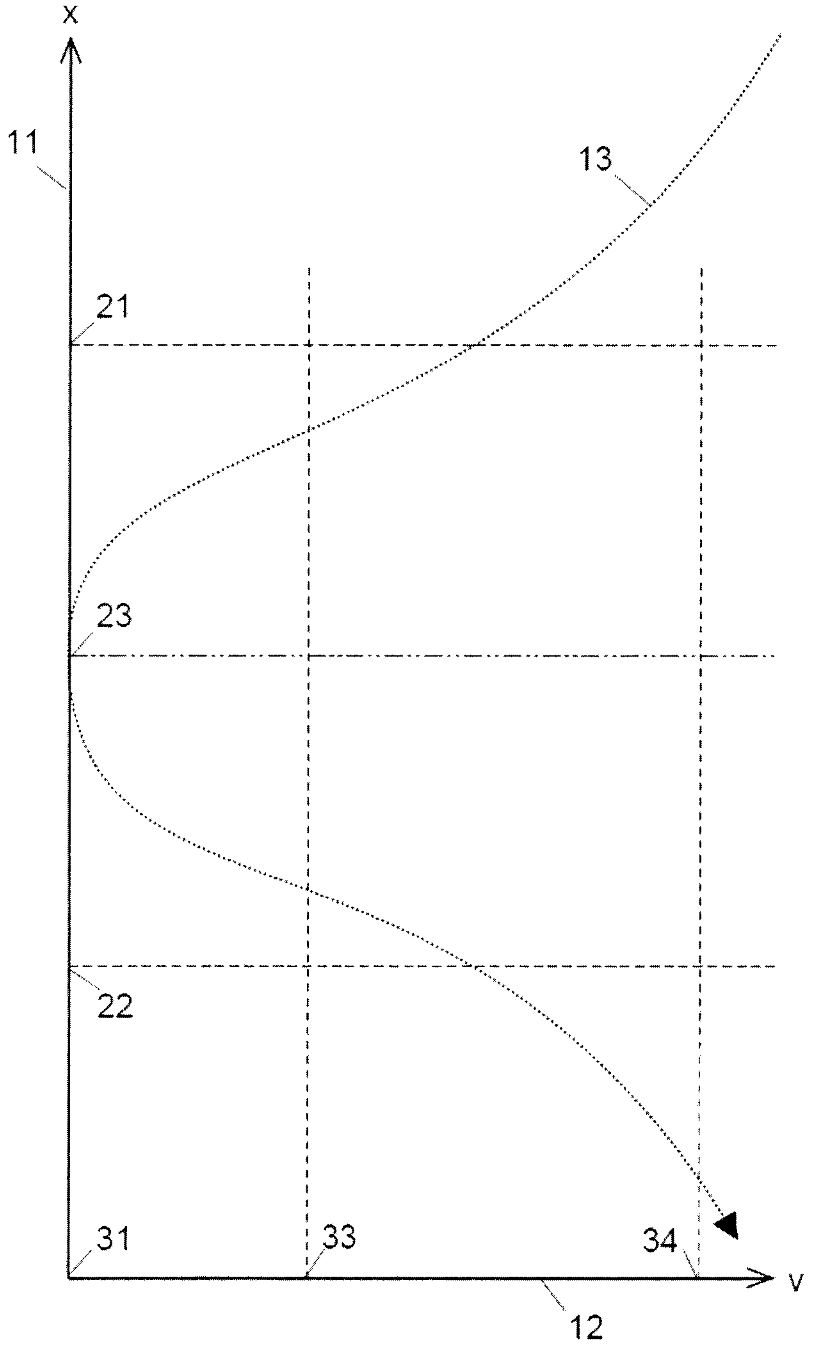
x
11
13
21
23
22
31
33
34
v
12

METHOD FOR SAFEGUARDING THE CAR OF AN ELEVATOR

This application claims the benefit under 35 USC § 119(a)-(d) of European Application No. 19 177 694.7 filed May 31, 2019, the entirety of which is incorporated herein by reference.

FIELD OF THE INVENTION

The present invention relates to a method for safeguarding the car of an elevator against unintended movement.

BACKGROUND OF THE INVENTION

The prior art discloses a method in which the car of an elevator is safeguarded against unintended movement. In this known method, a so-called unlocking zone is set up around the regular stopping positions of the car at the corresponding stopping points, the car being able to travel in said unlocking zone under specific conditions, at specific speeds, with the doors unlocked. An emergency stop of the car is initiated when the car moves with the doors unlocked outside the unlocking zones or moves more quickly than stipulated by the specific conditions within the unlocking zones. This has the advantage that the doors of the elevator can be reliably opened for the passengers just before the elevator stops and, similarly, that any adjustment of the height position of the car floor which may possibly be necessary can take place after the elevator stops, with the doors open, and the car nevertheless never travels in an undefined manner with the doors open.

SUMMARY OF THE INVENTION

It is the object of the present invention to provide an improved method.

The method according to the present invention is a method for safeguarding the car of an elevator, which is provided to form regular unlocking zones in the region around the envisaged stopping points at the stories, against unintended movement. The method monitors the speed of the car, the height position of the car in the elevator shaft and the status of the locking of the car door, and identifies possible stopping of the car, the height position of the car outside a regular unlocking zone, and a possibly unlocked state of the car door. A first sub-method of the method forms a temporary unlocking zone when the car stops outside a regular unlocking zone with the car door unlocked, and it assigns the temporary unlocking zone an upper and a lower boundary above and below the position where the car stops.

This can create the advantage that, once it has stopped, the elevator can be secured against unintended movement if the car is not located in the region of a regular unlocking zone stored in the memory of the elevator-control system. This can increase the safety of the elevator.

Car is intended to mean the cabin of the elevator. The car may have one or more doors. Unlocked means that at least one car door is unlocked. Locked means that all the car doors are locked. In the event of elevators not having any locking capability, locked means closed and unlocked means open. Unlocked is intended to mean an unlocked state at least of one car door, irrespective of whether the car door is open or closed. Stopping point is the floor level of the stopping point on a story at which the elevator car comes to a stop. An unlocking zone is that region below and above where the car stops in which the floor of the cabin has to be located in order for it to be possible for the shaft door to be unlocked at this stopping point. A regular unlocking zone is an unlocking zone which is around a stopping point and is stored in a memory of the elevator-control system. A temporary unlocking zone is an unlocking zone outside regular unlocking zones, which are stored in the memory of the elevator-control system. All the positions of the car relate at all times to the floor level of the car. Unintended movement is a movement or travel operation of the car which conflicts with the envisaged behavior of the elevator and, in particular, conflicts with applicable regulations for operating the elevator. The minimum and maximum values mentioned here and in the following text can come from country-specific, legal requirements and, in particular, corresponding standards.

The method preferably forms a second sub-method, which, in the event of the car traveling behind the upper or the lower boundary of the temporary unlocking zone with the car door unlocked, initiates an alarm reaction, in particular an emergency stop, in particular an actively braked emergency stop of the car.

This can create the advantage that, following unintended movement, the car is brought reliably to a stop. This can increase the safety of the passengers in the car.

An alarm reaction is a signal or a measure. An emergency stop is a stoppage of the car as a result of interruption to the power supply for the drive by the safety circuit being opened, or is an actively braked emergency stop. An actively braked emergency stop is a stoppage of the car as a result of the car being actively braked by a drive brake, cable brake, car brake or other braking device.

The first sub-method preferably assigns the temporary unlocking zone a maximum permissible traveling speed for the car within the temporary unlocking zone. The second sub-method preferably prevents an emergency stop of the car on account of the car traveling with the door unlocked outside a regular unlocking zone, when the car, with the door unlocked, is located within a temporary unlocking zone and does not exceed the maximum permissible traveling speed assigned to the temporary unlocking zone.

This can create the advantage that, in the event of stopping outside the regular stopping points, the car can be moved in an organized manner in order to allow for example the passengers to escape in an emergency. This can increase the safety of the passengers in the car.

The first sub-method preferably assigns the temporary unlocking zone a maximum permissible traveling speed for the car within the temporary unlocking zone. The second sub-method preferably initiates an emergency stop of the car when the car, with the car door unlocked, is located within a temporary unlocking zone and exceeds the maximum permissible traveling speed assigned to the temporary unlocking zone. In particular, this emergency stop is not an actively braked emergency stop. In particular, this emergency stop is an emergency stop which is brought about by the safety circuit of the elevator being opened and thus interrupts the power supply for the drive.

This can create the advantage that in the event of organized travel operation, following a stop outside the regular stopping points, the car is reliably brought to a stop if this travel operation gets out of control by picking up too much speed. This can increase the safety of the passengers in the car.

The first sub-method preferably files the values of the temporary unlocking zone in a memory of the elevator-control system.

This can create the advantage that the elevator-control system can correspondingly assign the actions to the temporary unlocking zone and implement the same.

The first sub-method preferably cancels the temporary unlocking zone again when the car doors are locked again. The temporary unlocking zone can also be canceled by a corresponding reset for the purpose of canceling the temporary unlocking zone.

This can create the advantage that the elevator resumes a regular state as quickly as possible in order to continue the travel operation for example to a regular stopping point. This can increase the safety and the comfort of the passengers.

The locking of the car door(s) can be detected by a sensor, which transmits the locking state of the car door(s) to the elevator-control system. Canceling of the temporary unlocking zone means that the abovedescribed actions of the unlocking zone are done away with.

The second sub-method preferably reads out the values of the temporary unlocking zone from a memory of the elevator-control system.

The second sub-method preferably cancels an emergency stop of the car again on account of a temporary unlocking zone when the car doors are locked again. The aforementioned emergency stop can also be canceled by a corresponding reset for the purpose of canceling the emergency stop.

This can create the advantage that the elevator is rendered ready to travel again as quickly as possible, in order to allow for any necessary adjustment in its height.

The method preferably has a third sub-method, which teaches the height positions of regular stopping points in particular during a teaching phase, in particular during teaching travel operation, and files them in particular in a memory. The third sub-method preferably forms regular unlocking zones at a specific distance, particular at a predetermined distance, around the height positions of the regular stopping points and files the upper and lower boundaries of said unlocking zones in a memory of the elevator-control system.

This can create the advantage that the elevator-control system treats the regular and temporary unlocking zones in a similar or identical manner. This can simplify the control system and increase the reliability thereof.

The method preferably implements the first sub-method prior to a teaching phase and/or during a teaching travel operation.

This can create the advantage that the elevator-control system a relevant model of the elevator together with the positions of the regular stopping points and regular unlocking zones. This can increase the efficiency of the elevator-control system and the safety of the elevator.

Prior to the teaching phase, there are still no regular unlocking zones stored in a memory of the elevator-control system. During the teaching phase or during the teaching travel operation, the regular unlocking zones are still not stored in full in a memory of the elevator-control system. In particular, the elevator-control system does not take account of regular unlocking zones which are not stored in its memory. It is preferably also the case that the method implements the first sub-methods during evacuation of the car outside a regular unlocking zones. In particular, in the event of an evacuation, the car is located at least to some extent in the region between the regular stories.

The elevator-control system according to the invention is an elevator-control system which is designed to implement the aforementioned method. In particular, the elevator-control system has a memory for the regular unlocking zones and the temporary unlocking zone.

This can create the aforementioned advantages.

The elevator according to the present invention is an elevator with the aforementioned elevator-control system, which is designed to implement the aforementioned method.

This can create the aforementioned advantages.

Further advantages of the present invention are specified in the drawings.

The advantages respectively mentioned can also be realized for combinations of features in the context of which they have not been mentioned.

BRIEF DESCRIPTION OF THE DRAWINGS

Exemplary embodiments of the present invention are illustrated in the drawings and will be explained in more detail hereinbelow. Like reference signs in the individual FIGURES here denote corresponding elements.

FIG. 1 shows a diagram of the unlocking zone.

DETAILED DESCRIPTION OF THE INVENTION

FIG. 1 shows the diagram of an unlocking zone.

The axis 11 shows the possible height position of the car of an elevator around a stopping point 23. The stopping point is surrounded by an unlocking zone, with an upper boundary of the unlocking zone 21 and a lower boundary of the unlocking zone. Within the unlocking zone, the car can travel, under certain conditions, with the doors unlocked. The axis 12 shows the speed of a car of an elevator in the region of an unlocking zone and has various speed barriers 31, 33 and 34.

The zero point of the speed 31 corresponds to the car being at a standstill. The maximum permissible arrival speed 34 defines the maximum permissible speed of the car with the doors unlocked in the unlocking zone. The maximum permissible adjustment speed 33 defines the maximum permissible speed of the car in the unlocking zone following a stop with the doors unlocked until the doors are locked again.

The speed profile 13 of a stopping car shows the car entering into the unlocking zone (21, 22) at the upper boundary of the unlocking zone 21 at a speed below the maximum permissible arrival speed 34. Following entry into the unlocking zone (21, 22), the doors are unlocked and begin to open. The speed profile 13 of the car continues to run below the arrival speed 34 until it comes to a standstill in the region of the stopping point 23. Following the standstill, it is possible to adjust the position of the car at a speed below the maximum permissible adjustment speed 33. Following closure and locking of the door(s) for departure, the speed profile 13 runs independently of the maximum permissible adjustment speed 33 and of the maximum permissible arrival speed 34.

In an unlocking zone (21, 22), with the doors unlocked the maximum arrival speed 34 is equal to 0.8 m/s (5.12.1.4.c) and the maximum adjustment speed is equal to 0.3 m/s (5.12.1.4.d), it otherwise being necessary to initiate an emergency stop (5.6.7.1) with specific conditions relating to the location of the subsequent stop (5.6.7.5). An unlocking zone has a maximum extent of 20 cm below and above the stopping point, when the doors of the car and shaft are not driven jointly, and of 35 cm, when the doors of the car and shaft are driven jointly. This means that the upper and the lower boundaries of the unlocking zone are each at a distance of 20 cm or 35 cm from the stopping point.

In the case of known elevators, the unlocking zones around the regular stopping locations at the stories are generally predefined to some extent by corresponding mechanical markings in the shaft or by height positions for the corresponding boundaries of the unlocking zones being stored in an electric memory of the elevator-control system.

The method according to the invention takes effect, in particular, when, for whatever reason, the car stops outside the predefined regular unlocking zones. This is conceivable for example when the elevator is started up before or during the teaching phase for defining the story positions and the corresponding regular unlocking zones, when, before or during the teaching phase, the regular unlocking zones are not yet defined and stored in the memory of the elevator-control system, or for example in the event of a stoppage, emergency stop or evacuation between the stories.

If, in such a situation, the car does not come to a standstill in a regular unlocking zone and/or if the doors of the car are to be unlocked outside a regular unlocking zone, then the car would not be secured against unintended or excessively quick movement.

Therefore, the method according to the invention also makes provision, irrespective of regular stopping points at the stories, for temporary unlocking zones to be formed in the event of the car stopping, and/or in the event of the car door(s) being unlocked, outside regular unlocking zones of the regular stopping points.

As soon as a stoppage and/or an unlocking of the car door(s) outside the regular unlocking zones is detected, a temporary unlocking zone is set up immediately around the position of the event. The position of the event is considered here temporarily to be a stopping point. The temporary unlocking zone can be set up for an elevator with permanent and continuous detection of the height position in that a memory of the elevator-control system is assigned the values for the upper and lower unlocking zones, or the value of the position where the stoppage occurs, whereas the elevator-control system has the relative extent predetermined in a permanently stored manner.

The temporary unlocking zone is maintained until the car doors are locked again. Once the unlocking zone has been canceled, the actions thereof are done away with. The temporary unlocking zone can be canceled by virtue of the values for the upper and lower boundaries of the temporary unlocking zone being deleted.

If a temporary unlocking zone set up is one in which the floor level of the car is located, and if the movement speed exceeds the corresponding limit values or if the car, with the car door unlocked, travels beyond the boundaries of the unlocking zone, then the method implements an emergency stop of the car. The emergency stop can be implemented by the safety circuit of the elevator being opened, said safety circuit interrupting the motor drive and/or activating the car brakes. The emergency stop can be deactivated again by a corresponding reset of the elevator.

LIST OF REFERENCE SIGNS

11 Height position of the floor level of the car
12 Speed of the car
21 Upper boundary of the temporary unlocking zone
22 Lower boundary of the temporary unlocking zone
23 Stopping point (floor level of the story)
31 Zero point of the speed
33 Maximum permissible adjustment speed
34 Maximum permissible arrival speed

The invention claimed is:

1. A method for safeguarding a car of an elevator, which is forms regular unlocking zones in a region around predetermined stopping points at floors of a building to prevent unintended movement, the method comprising the steps of:

monitoring a speed of the car, a height position of the car in an elevator shaft, and a locking status of a car door; and identifying whether the car is stopping, a height position outside the regular unlocking zone, and an unlocked state of the car door, and having a first sub-method, wherein in the event that the car stops at a position outside of the regular unlocking zone with the car door in the unlocked state, a temporary unlocking zone is formed having an upper boundary and a lower boundary above and below the position where the car stops.

2. The method according to claim 1, having a second sub-method, wherein in the event that the car travels beyond the upper boundary or the lower boundary of the temporary unlocking zone with the car door in the unlocked state, an alarm reaction is initiated to provide an emergency stop, including an actively braked emergency stop of the car.

3. The method according to claim 1, wherein the first sub-method forms the temporary unlocking zone with a maximum permissible traveling speed for the car, and wherein in the second sub-method, in the event that the car does not exceed the maximum permissible traveling speed with the car door in the unlocked state within the temporary unlocking zone, an emergency stop of the car is prevented since the car traveling with the car door in the unlocked state is outside of the regular unlocking zone.

4. The method according to claim 1, wherein in the first sub-method, the temporary unlocking zone is formed with a maximum permissible traveling speed for the car, and/or wherein in the second sub-method, if the car exceeds the maximum permissible traveling speed with the car door in the unlocked state within a temporary unlocking zone, an emergency stop of the car is initiated.

5. The method according to claim 1, wherein in the first sub-method, values of the temporary unlocking zone are stored in a memory of an elevator-control system and/or the temporary unlocking zone is cancelled again on account of the locking of the car door or a reset for the purpose of canceling the temporary unlocking zone.

6. The method according to claim 1, wherein in the second sub-method, values of the temporary unlocking zone are read from a memory of an elevator-control system and/or an emergency stop is cancelled again on account of the locking of the car door or a reset for the purpose of canceling the emergency stop.

7. The method according to claim 1, having a third sub-method, wherein height positions of regular stopping points are taught during a teaching phase including a teaching travel operation, and are stored in a memory, and the regular unlocking zones are formed at a specific predetermined distance around the height positions of the regular stopping points, and the upper and lower boundaries of the unlocking zones are stored in a defined manner in the memory.

8. The method according to claim 1, wherein the first sub-method is implemented prior to performing a teaching phase, and/or during a teaching travel operation, and/or during evacuation of the car outside of a regular teaching zone, and/or in the event that regular stopping points have not been correctly stored in a memory of an elevator-control system.

9. An elevator-control system designed to implement the method of claim 1.

10. An elevator designed to implement the method of claim 1.

* * * * *